S. T. FRENCH.
COMBINED JOINT AND HINGE.
APPLICATION FILED MAR. 7, 1921.

1,417,984.

Patented May 30, 1922.

INVENTOR:
Sherman T. French,
By Frank H. Hoenen
ATTORNEY.

UNITED STATES PATENT OFFICE.

SHERMAN T. FRENCH, OF INDIANAPOLIS, INDIANA, ASSIGNOR OF ONE-HALF TO MARSHAL D. WADE, OF INDIANAPOLIS, INDIANA.

COMBINED JOINT AND HINGE.

1,417,984.  Specification of Letters Patent.  Patented May 30, 1922.

Application filed March 7, 1921. Serial No. 450,448.

*To all whom it may concern:*

Be it known that I, SHERMAN T. FRENCH, a citizen of the United States, residing at Indianapolis, in the county of Marion and State of Indiana, have invented certain new and useful Improvements in Combined Joints and Hinges, of which the following is a specification.

This invention relates to a combined joint and hinge which are particularly adapted for use in detachably and hingedly securing sheets of metal together, and has, therefore, a wide range of utility.

The principal object of the invention consists in the provision of a joint and a hinge for the securing together of thin metal sheets in a simple, efficient and economical manner.

A further object of the invention consists in the provision of a joint and a hinge for connecting either permanently, detachably or hingedly sheets of metal whereby a neater appearing symmetrical joint or hinge is formed for use in the construction of certain articles of commerce than is possible with the construction of similar joints and hinges now in use. As an illustration, the present invention is particularly applicable in the production of a hinge for attaching the fallboards in pianos; and also for connecting the several sections of automobile hoods, wherein hinges of considerable length are usually employed.

I accomplish the above objects of the invention, and such others as may appear from a perusal of the following description and claim, by means of the construction illustrated in the accompanying drawings, forming a part hereof, in which—

Figure 1:
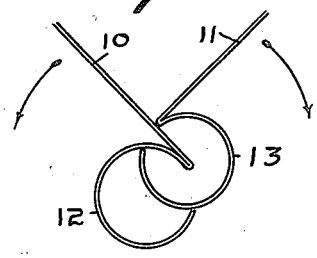
Figure 2:
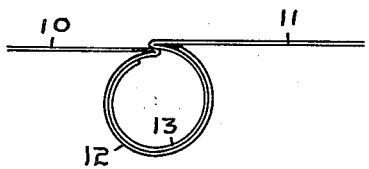
Figure 3:
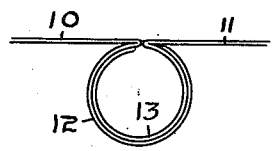
Figure 4:
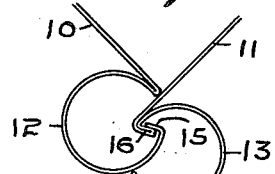
Figure 5:
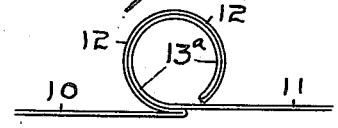
Figure 6:
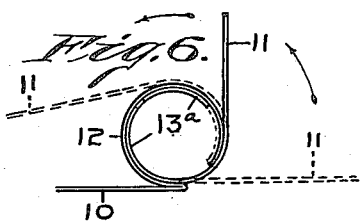
Figure 7:
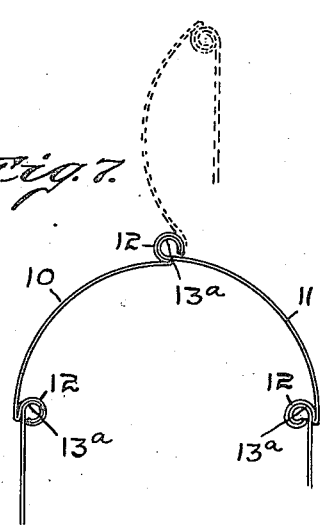

Figure 1 is an end view of one of my improved joints for connecting thin metal sheets, showing the initial position of the sheets in connecting them together. Fig. 2 illustrates the position of the assembled parts. Fig. 3 illustrates the final relative positions of the parts in certain cases where the joint is employed. Fig. 4 illustrates a modified form wherein the present invention forms a hinge between the connected sheets. Fig. 5 is a further exemplification of my improved joint. Fig. 6 is a view similar to Fig. 5, except that one of the metal sheets is shown as occupying vertical position. Fig. 7 illustrates my improved joint and hinge as employed in the construction of an automobile hood.

Referring to the drawings, 10 and 11 represent two thin metal sheets to be connected together by the use of my invention. One edge of sheet 10 is formed into an open roll 12, in the manner as clearly shown in Fig. 1. The adjacent edge of sheet 11 is formed into a roll 13 similar to roll 12, except that roll 13 is bent in a reverse direction from that of roll 12, and roll 13 is sufficiently reduced in diameter so as to be easily inserted into the hollow portion of roll 12 when the sheets are assembled. The first step in the operation of connecting sheets 10 and 11 is shown in Fig. 1, and as the free ends of the sheets are depressed in the direction of the arrows until they assume the positions shown in Fig. 2 roll 13 will be almost entirely within the confines of roll 12. In this position sheets 10 and 11 are securely locked together and can not be separated except in moving the sheets in the reverse direction from the one employed in connecting them together. The joint formed by the rolls 12 and 13 are shown on the lower sides of sheets 10 and 11, but in many cases it may be desirable to place the joint on the top of the sheets and which is accomplished by turning the lower sides of the sheets up. In either case, the joint here described will securely connect metal sheets together and will resist the passage of water, so that the present invention may be readily adapted for the securing of metal roofing sheets together.

The construction shown in Fig. 3 is a duplication of Fig. 2 except that the metal sheets 10 and 11 are depressed somewhat further than shown in Fig. 2 so as to bring the opposing bent edges of the sheets flush with each other, thereby leaving the surface of the connected sheets straight and smooth, which may be found more desirable in some cases than the arrangement shown in Fig. 2.

Fig. 4 illustrates a modified construction wherein each sheet 10 and 11 is permitted to rock independently of the other a limited distance, but the sheets cannot be connected or disconnected in the manner shown in Fig. 1. In Fig. 4 the free edge of roll 12 is formed into a hook 15, and the edge of sheet 11, where the reverse bending of the metal occurs to form roll 13, is bent into a hook 16. In this last construction when sheets 10 and 11 are rocked a certain distance relatively to each other hooks 15 and 16 will be brought into contact with each other and prevent the complete separation of the two sheets. Sheets 10 and 11 may be connected or disconnected from each other by moving one or both of the sheets longitudinally.

Figs. 5 and 6 illustrate a further modified construction of the invention forming a hinge. In this construction one edge of sheet 10 is bent into a roll 12 similar to that shown in Fig. 1, and the adjacent edge of sheet 11 is merely bent into a roll 13$^a$ without a reverse bending of the metal. As shown in Fig. 7 the joining rolls 12 and 13$^a$ may be formed on the external and internal surfaces of the metal sheets so as to extend the range of utility of the invention. In the last mentioned form, the construction may advantageously be employed for attaching the fall-boards on pianos, or for connecting the several sections forming a hood for an automobile, affording the parts a wide range of movement without danger of accidental separation. Moreover, a smooth unnotched surface is presented to exclude dust and dirt, besides imparting a neater appearance upon the article where it is employed than is possible to obtain with the present style of hinges in use.

The invention is so simple and easily understood, that further description thereof is deemed unnecessary.

Having thus fully described my said invention, what I desire to secure by Letters Patent, is—

A combined joint and hinge for connecting the meeting edges of sheets of metal consisting in bending the metal along one edge of one sheet back upon the sheet to form an open cylindrical roll, a hook formed along the edge of the metal where the reverse bending occurs, a roll formed along the edge of the adjacent sheet in which the bending operation is reversed from that in the preceding roll, and a hook formed along the free end of the last roll for enforcing longitudinal movement in introducing one roll into the other, the said hooks preventing the rolls from being disconnected except by a corresponding longitudinal movement.

In witness whereof I have hereunto set my hand and seal at Indianapolis, Indiana, this 3rd day of March, A. D. one thousand nine hundred and twenty-one.

SHERMAN T. FRENCH. [L. S.]